(12) United States Patent
Alecu

(10) Patent No.: US 11,945,598 B2
(45) Date of Patent: Apr. 2, 2024

(54) VAPOR-TO-AIR HEAT EXCHANGER FOR AIRCRAFT POWERPLANT

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 174 days.

(21) Appl. No.: 17/669,536

(22) Filed: Feb. 11, 2022

(65) Prior Publication Data

US 2023/0257133 A1 Aug. 17, 2023

(51) Int. Cl.
*B64D 33/12* (2006.01)
*F28D 21/00* (2006.01)

(52) U.S. Cl.
CPC ...... *B64D 33/12* (2013.01); *F28D 2021/0021* (2013.01)

(58) Field of Classification Search
CPC . B64D 33/12; B64D 33/08; F28D 2021/0021; F28D 2021/0063; F28D 2021/0064
See application file for complete search history.

(56) References Cited

U.S. PATENT DOCUMENTS

| | | | |
|---|---|---|---|
| 4,305,456 A | 12/1981 | Mueller et al. | |
| 4,484,623 A | 11/1984 | Rowe et al. | |
| 5,927,383 A | 7/1999 | Ramm-Schmidt et al. | |
| 2003/0116305 A1 | 6/2003 | Beddome et al. | |
| 2007/0029075 A1* | 2/2007 | Mehendale | F28D 1/0341 165/176 |
| 2018/0224224 A1* | 8/2018 | Bruemmer | F28D 21/0001 |
| 2019/0014687 A1* | 1/2019 | Snyder | H05K 7/209 |
| 2019/0049156 A1 | 2/2019 | Vaisman et al. | |

FOREIGN PATENT DOCUMENTS

DE 3242531 5/1984
FR 2112006 6/1972

* cited by examiner

*Primary Examiner* — Rodney A Bonnette
(74) *Attorney, Agent, or Firm* — NORTON ROSE FULBRIGHT CANADA LLP

(57) ABSTRACT

A vapor-to-air heat exchanger for an aircraft powerplant that includes: a pressurized vapor source supplying vapor; and a condenser including a condenser inlet in fluid communication with the pressurized vapor source to receive the vapor, a condenser outlet, and at least one pneumatic vessel defining a cavity in fluid communication between the condenser inlet and the condenser outlet. The pneumatic vessel is reversibly inflatable to be configurable between a collapsed vessel configuration and an inflated vessel configuration. A volume of the cavity is greater in the inflated vessel configuration than in the collapsed vessel configuration. The pneumatic vessel is inflatable from the collapsed vessel configuration to the inflated vessel configuration when the cavity is pressurized by the vapor.

20 Claims, 6 Drawing Sheets

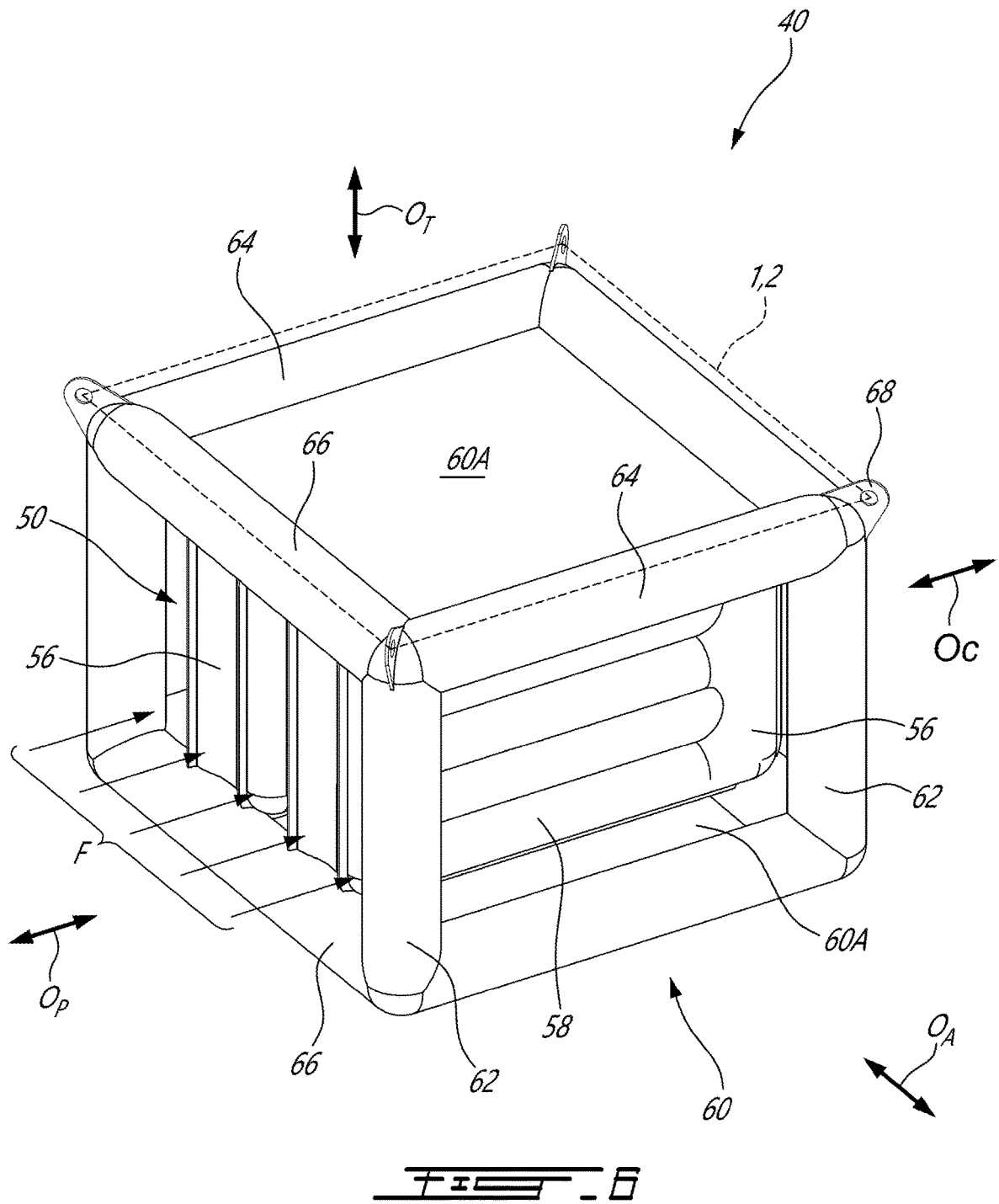

VAPOR-TO-AIR HEAT EXCHANGER FOR AIRCRAFT POWERPLANT

TECHNICAL FIELD

The disclosure relates generally to aircraft engines and, more particularly, to heat exchanger systems for aircraft powerplants.

BACKGROUND

Aircraft powerplants have stringent cooling requirements, some of which are typically addressed by liquid-to-air heat exchangers. In such heat exchangers, a closed-loop fluidic circuit carries a liquid coolant from the vicinity of a source of heat of the powerplant, to a heat exchanger at which the liquid coolant rejects the heat into cooling airflow(s). With the advent of hybrid powerplants in aeronautics, the quantity, locations and overall output of the sources of heat requiring cooling have evolved, which presents challenges in implementing heat exchangers that are suitable in terms of size, weight and cooling capacity.

SUMMARY

In accordance with an aspect of the present disclosure, there is provided a vapor-to-air heat exchanger for an aircraft powerplant, comprising: a pressurized vapor source supplying vapor; and a condenser including a condenser inlet in fluid communication with the pressurized vapor source to receive the vapor, a condenser outlet, and at least one pneumatic vessel defining a cavity in fluid communication between the condenser inlet and the condenser outlet, the at least one pneumatic vessel being reversibly inflatable to be configurable between a collapsed vessel configuration and an inflated vessel configuration, a volume of the cavity being greater in the inflated vessel configuration than in the collapsed vessel configuration, the at least one pneumatic vessel being inflatable from the collapsed vessel configuration to the inflated vessel configuration when the cavity is pressurized by the vapor.

In accordance with another aspect of the present disclosure, there is provided a vapor-to-air heat exchanger for an aircraft powerplant, comprising: an evaporator supplying vapor; and a condenser including: a condenser inlet in fluid communication with the evaporator to receive vapor therefrom; a condenser outlet; and an array of pneumatic vessels spaced from one another in an array orientation so as to define at least one air flow path along a path orientation transverse to the array orientation, at least one pneumatic vessel of the array of pneumatic vessels defining an cavity, a plane transverse to the array orientation extending through the cavity, the cavity being in fluid communication between the condenser inlet and the condenser outlet, the at least one pneumatic vessel being inflatable when the cavity is pressurized by the vapor to transition from a collapsed vessel configuration to an inflated vessel configuration, a size of the at least one pneumatic vessel in the array orientation being greater in the inflated vessel configuration than in the collapsed vessel configuration.

In accordance with another aspect of the present disclosure, there is provided a powerplant for an aircraft, comprising: a power unit rejecting heat at a nominal heat rejection rate; and a vapor-to-air heat exchanger including: an evaporator thermally coupled to the power unit so as to supply vapor at a nominal pressure upon the power unit rejecting heat at the nominal heat rejection rate; and a condenser including a condenser inlet downstream of the evaporator, a condenser outlet, and at least one pneumatic vessel being inflatable and defining an cavity in fluid communication between the condenser inlet and the condenser outlet, the at least one pneumatic vessel being configurable between a collapsed vessel configuration and an inflated vessel configuration, the at least one pneumatic vessel being inflatable from the collapsed vessel configuration to the inflated vessel configuration upon the cavity being pressurized up to the nominal pressure.

BRIEF DESCRIPTION OF THE DRAWINGS

Reference is now made to the accompanying figures in which:

FIG. 6 is a perspective view of a condenser of the heat exchanger of FIG. 1 according to another embodiment.

DETAILED DESCRIPTION

Figure 1:
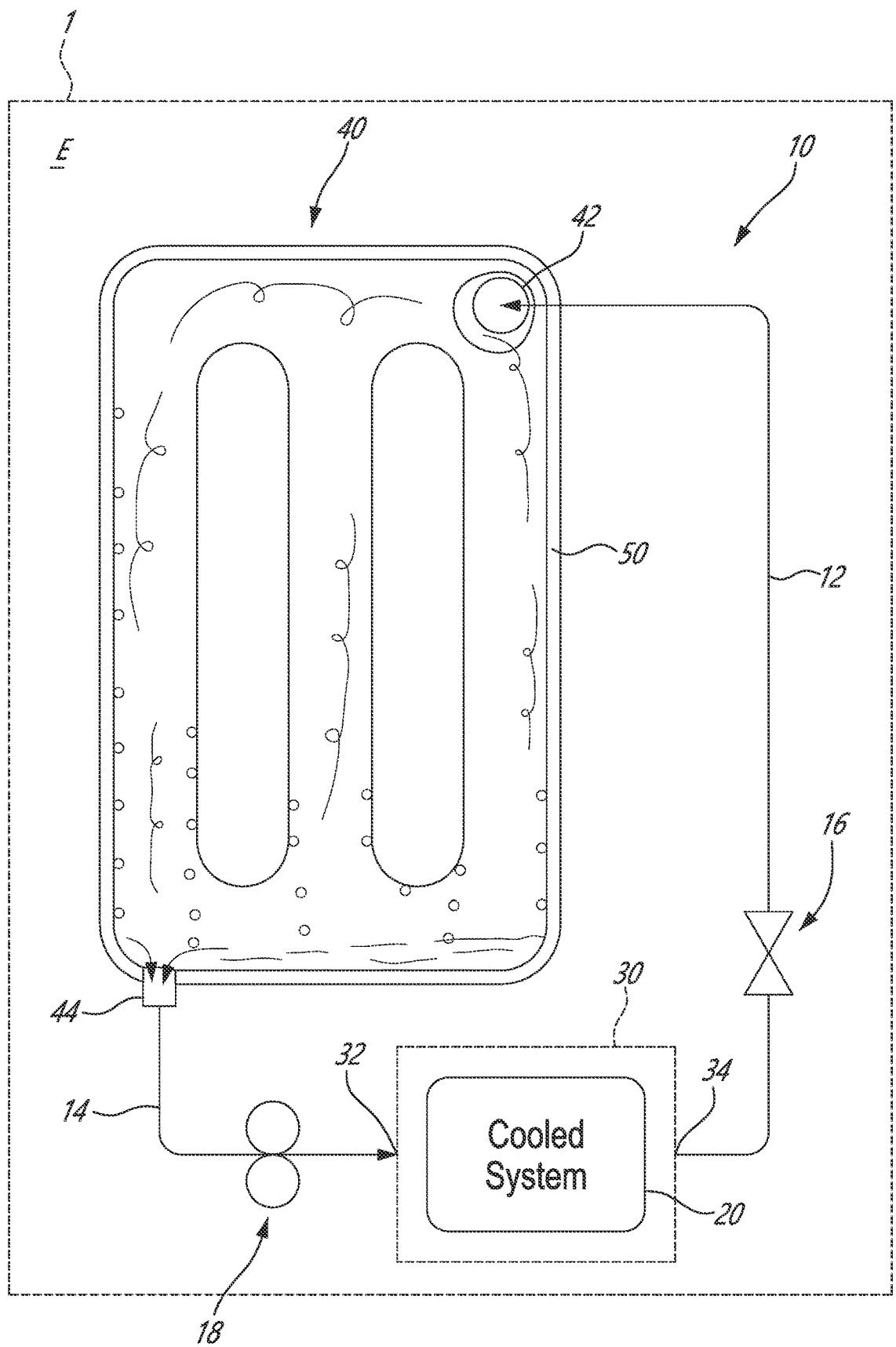
FIG. 1 is a schematic view of a heat exchanger for a powerplant.

A heat exchanger 10 is generally shown at 10, depicted on FIG. 1 in a heat exchange relationship between a cooled system 20, or heat source, of a powerplant 1 and an environment E of the powerplant 1. The powerplant 1 may be any suitable aircraft engine, whether a gas turbine engine, a primarily electric engine, a hybrid-electric engine, or any combination of same. The cooled system 20 may be any component of the powerplant 1 that employ cooling. Among exemplary possibilities, the cooled system 20 may be a power unit of the powerplant 1, such as a fuel system in the case of a powerplant including an internal combustion engine, or a battery pack in the case of a powerplant including an electric motor. The cooling of the battery pack via the heat exchanger 10 may assist in maintaining the integrity of the battery pack as well as suitable lifespan and charging and discharging regimes. The cooled system 20 may also be an oil system of the powerplant 1. The cooled system 20 may also be a turbine case of a gas turbine engine. The cooling of the turbine case may assist in maintaining a suitable clearance with a rotor surrounded thereby.

The heat exchanger 10 is of the closed circuit type, meaning that a cooling fluid it contains remains captive notwithstanding undesired leakage. Hence, the heat exchanger 10 allows to transfer heat to and from its cooling fluid without any variation in mass of the cooling fluid contained thereby. The cooling fluid is of a type selected to change between gaseous and liquid phases under operating conditions of the powerplant 1, namely to evaporate as it absorbs heat transferred thereto by the cooled system 20, and to condensate as it rejects heat to the environment E. The cooling fluid may be water, although other suitable cooling fluids may be used, such as carbon tetrachloride. Advantageously, the cooling fluid may be inflammable, which may contribute to fire containment in case of an accidental leakage.

Hence, the heat exchanger 10 comprises an evaporator 30 thermally coupled to the cooled system 20 so as to absorb heat therefrom at a target cooling rate. The architecture of the evaporator 30 may vary depending on the embodiment, so long as it is suitable for circulating the cooling fluid alongside the cooled system 20 in a manner allowing the transfer of thermal energy from the cooled system 20 to the cooling fluid, causing the cooling fluid to evaporate in the process. The heat exchanger 10 also comprises a condenser 40 remote from the evaporator 30. Fluid lines, or conduits 12, 14 of the heat exchanger 10 are routed between the evaporator 30 and the condenser 40 to allow circulation of the cooling fluid in the heat exchanger 10. Namely, a first conduit 12 is in fluid communication between an evaporator outlet 34 of the evaporator 30 and a condenser inlet 42 of the condenser 40. The condenser inlet 42 may in some cases be a part of the first conduit 12. A second conduit 14 is in fluid communication between a condenser outlet 44 of the condenser 40 and an evaporator inlet 32 of the evaporator 30. The condenser outlet 44 may in some cases be a part of the second conduit 14. The condenser 40 is disposed in the powerplant 1 so as to be exposed to a flow of air having an incoming temperature and volumetric flow rate that are suitable for convecting heat away from the condenser 40 at a target rejection rate commensurate to the target cooling rate, and the conduits 12, 14 are routed and sized accordingly.

In some embodiments, the heat exchanger 10 includes one or more flow-regulating means 16, 18 in fluid communication between the evaporator 30 and the condenser 40. As the cooling liquid flows through the evaporator 30, the cooling fluid evaporates into the gaseous phase (i.e., into vapor) and in doing so, causes a pressure increase across the evaporator 30, i.e., an evaporator inlet pressure at the evaporator inlet 32 is less than an evaporator outlet pressure at the evaporator outlet 34. The evaporator 30 may thus be referred to as a pressurized vapor source. In some embodiments, the heat exchanger 10 includes a pressure regulating valve 16 in fluid communication with the first conduit 12 between the evaporator 30 and the condenser inlet 42. The pressure regulating valve 16 may be a laminar flow valve. The valve 16 may assist in conveying the vapor to the condenser 40 at a flow rate and a pressure commensurate to the capacity of the condenser 40. As the cooling fluid flows through the condenser 40, the cooling fluid condensates into the liquid phase (i.e., into condensate) and in doing so, causes a pressure drop across the condenser 40, i.e., a condenser inlet pressure at the condenser inlet 42 is greater than a condenser outlet pressure at the condenser outlet 44. In this embodiment, the heat exchanger 10 includes a pump 18 disposed in fluid communication with the second conduit 14 between the condenser outlet 44 and the evaporator 30. The pump 18 may assist in conveying the condensate to the evaporator 30 at a flow rate and a pressure commensurate to the capacity of the evaporator 30.

In some embodiments, the condenser 40 may be sized and arranged so as to accept the cooling fluid in the flow conditions outputted at the evaporator outlet 34 and perform at the target rejection rate, such that the valve 16 may be omitted. In some embodiments, the evaporator 30 may be sized and arranged so as to accept the cooling fluid in the flow conditions outputted at the condenser outlet 44 and perform at the target cooling rate, such that the pump 18 may be omitted. Stated otherwise, in some embodiments, the heat exchanger 10 may be oversized in view of the target cooling rate such that the flow-regulating means (e.g., the valve 16 and/or the pump 18) may be omitted. Oversizing the heat exchanger 10 may mean oversizing a size of the condenser 40 relative to a size of the evaporator 30 such that the condenser 40 is capable of condensating more vapor than the evaporator 30 can produce. The size of the condenser 40 may correspond to a surface area of the condenser 40 forming an outbound heat transfer interface between the cooling fluid and the flow of air. The size of the evaporator 30 may correspond to a surface area of the evaporator 30 forming an inbound heat transfer interface between the cooled system 20 and the cooling fluid. Oversizing the heat exchanger 10 may render a nominal heat rejection rate of the condenser 40 greater than the target cooling rate.

Figure 2:
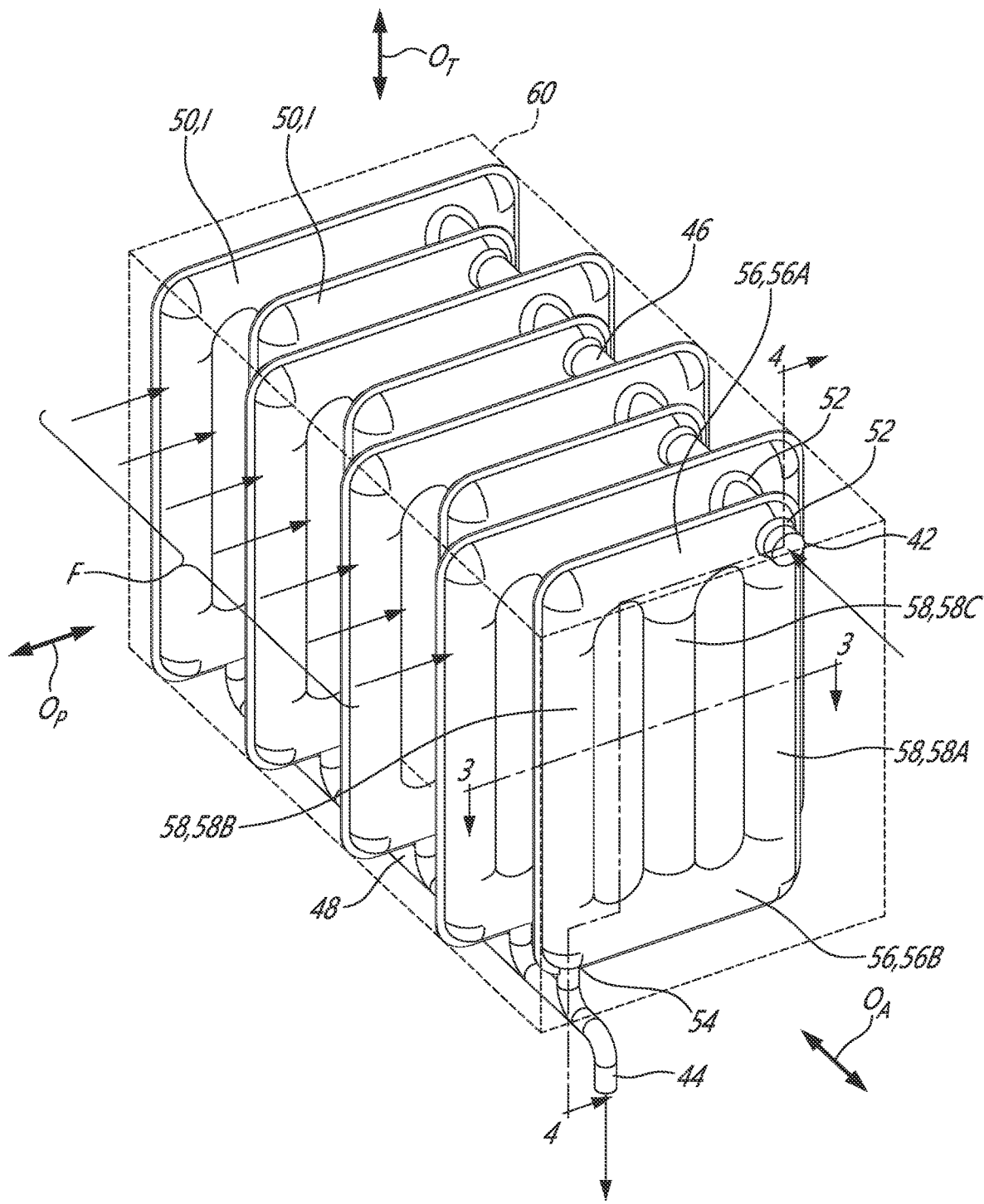
FIG. 2 is a perspective view of a condenser of the heat exchanger of FIG. 1 according to an embodiment.
Figure 3:
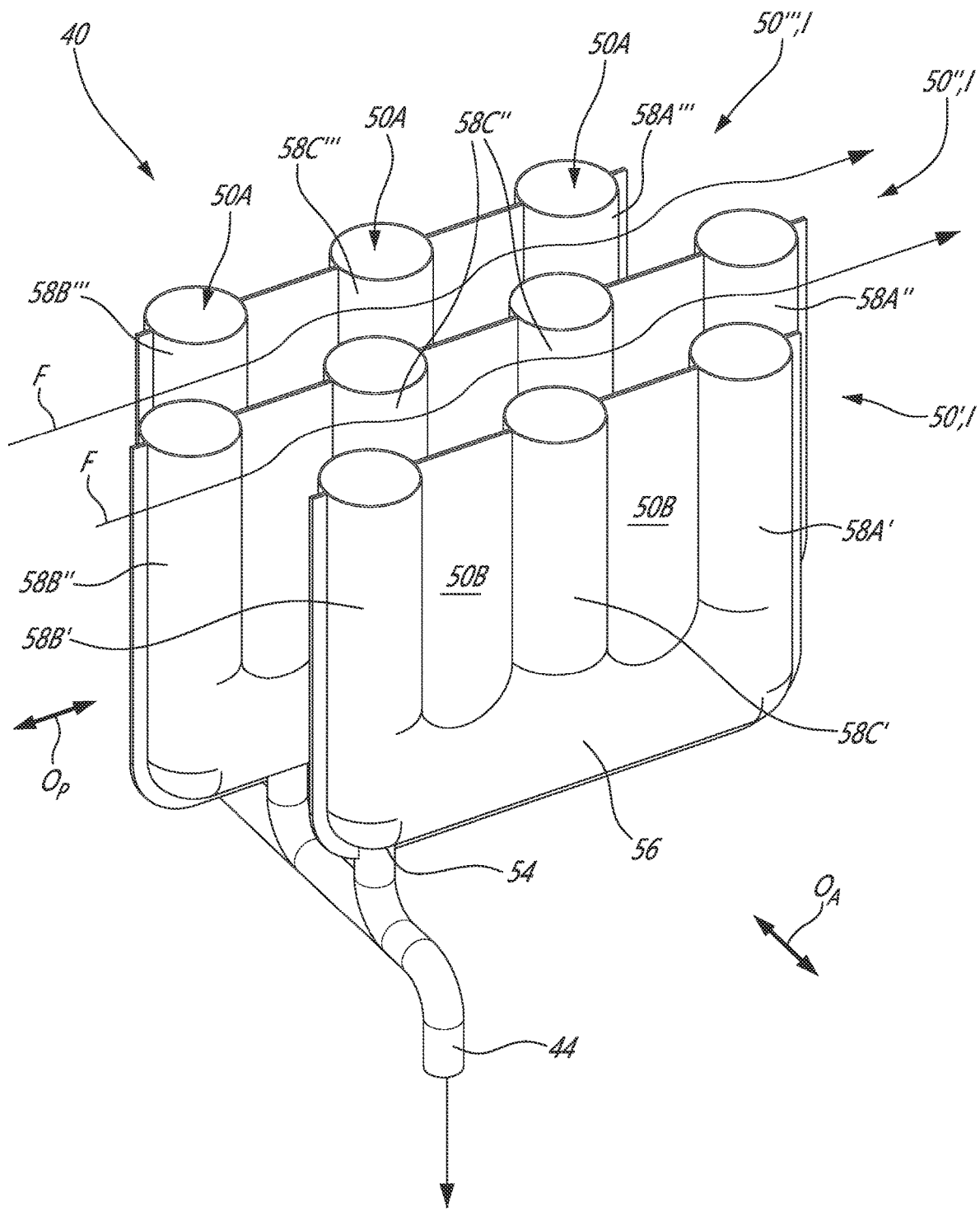
FIG. 3 is a partial cut-away view of the condenser of FIG. 2, taken along the line 3-3 of FIG. 2.
Figure 4:
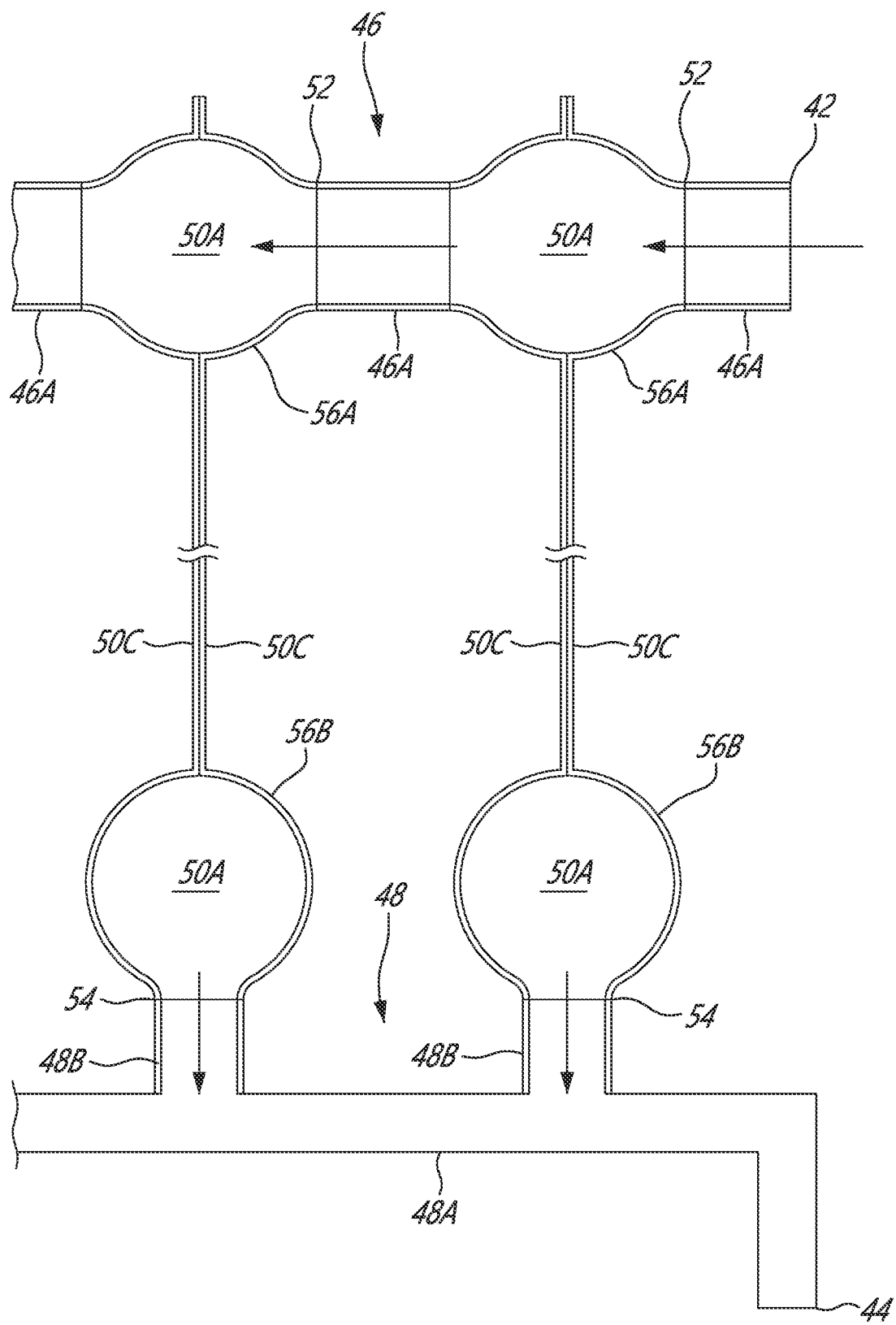
FIG. 4 is a partial cross-sectional view of the condenser of FIG. 2, taken along the line 3-3 of FIG. 2.

With reference to FIGS. 2-6, the condenser 40 will now be described in more detail. The condenser 40 includes at least one pneumatic vessel 50 (henceforth individually referred to as "the vessel 50"), a supply conduit 46 and a drainage conduit 48 (FIGS. 2, 4). As seen in FIGS. 3 and 4, the vessel 50 has a vessel inlet 52 for receiving the vapor from the supply conduit 46, a vessel outlet 54 for rejecting the condensate into the drainage conduit 48, and defines an interior cavity 50A (hereinafter simply "cavity") in fluid communication between the vessel inlet and outlet 52, 54 for condensating the vapor into the condensate. The vessel inlet 52 and outlet 54 are respectively in fluid communication with the condenser inlet 42 and outlet 44. In the depicted embodiments, the vessel 50 is one of a plurality of vessels 50, including seven vessels 50 in the embodiment of FIGS. 2 to 5, and four vessels 50 in the embodiment of FIG. 6. In either embodiment, the vessels 50 are in fluid communication with one another via the supply and drainage conduits 46, 48 of the condenser 40. The supply conduit 46 is in fluid communication between the condenser inlet 42 and the vessel inlets 52 of the vessels 50, whereas the drainage conduit 48 is in fluid communication between the vessel outlets 54 of the vessels 50 and the condenser outlet 44. Hence, in embodiments having a plurality of vessels 50, the supply conduit 46 and the drainage conduit 48 may respectively form part of a supply manifold and a drainage manifold of the condenser 40. In embodiments having a sole vessel 50, the supply and drainage conduits 46, 48 may respectively form part of the first and second conduits 12, 14.

As the "pneumatic" qualifier implies, the vessel 50 is inflatable. The cavity 50A has a volume that is variable depending on an effective pressure it is subjected to, that is, a difference between an internal pressure exerted on the vessel 50 from within the cavity 50A, and an external pressure exerted on the vessel 50 from outside the cavity 50A. By varying its degree of inflation, the vessel 50 is configurable between a collapsed vessel configuration C (FIG. 5) and an inflated vessel configuration I (FIGS. 2-5).

The vessel 50 may be in the collapsed vessel configuration C for example upon the effective pressure being negative (i.e., upon a suction being exerted into the cavity 50A) or negligible, for example below about 200 Pa, i.e., about 0.03 pounds/sq. inch (psi). The vessel 50 may be in the inflated vessel configuration when the effective pressure is of at least a nominal pressure. The nominal pressure may correspond to a pressure at which the evaporator 30 supplies the vapor under certain operating conditions of the powerplant 1. In the depicted embodiment, the vessel 50 is structured and arranged so as to be in the inflated vessel configuration I while being able to withstand an effective pressure of about 137,895 Pa, i.e., about 20 psi. In some embodiments, the vessel 50 may be structured and arranged so as to be in the inflated vessel configuration I under a relatively low effective pressure. In some embodiments, the vessel 50 may also be structured and arranged to be able to withstand a maximum effective pressure relatively close to the nominal pressure so as to minimize weight.

Figure 5:
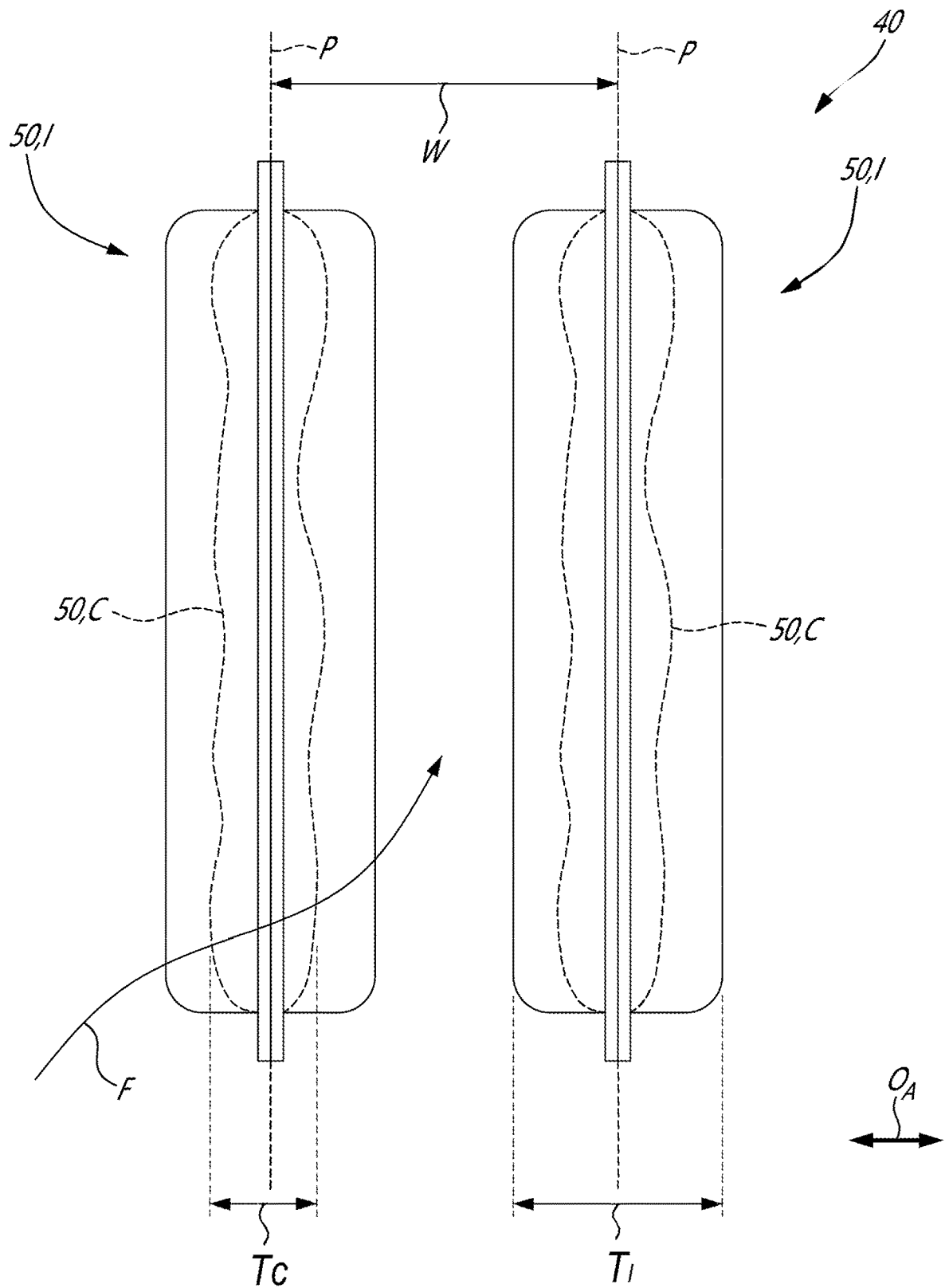
FIG. 5 is an elevation view of vessels of the condenser of FIG. 2.

The vessel 50 may be said to have a plate-like shape, meaning that the vessel 50 may be disposed in a deployed position so as to lay flat and thereby define a notional plane P (FIG. 5). In the collapsed vessel configuration C, the vessel 50 is flexible, at least to some degree, such that it may bend, buckle or otherwise deform under external loads so as to be in various positions other than the deployed position. In the inflated vessel configuration I, the vessel 50 is comparatively more rigid and tends to resist external loads so as to remain in the deployed position.

Depending on the embodiment, the condenser 40 may include a support structure 60 (FIGS. 2, 6) that is suitable for holding the vessel 50 in the deployed position regardless of the vessel 50 being in the collapsed vessel configuration C or the inflated vessel configuration I. In embodiments in which a plurality of vessels 50 are provided, the support structure 60 may hold the vessels 50 in an arrayed position, i.e., at a distance from one another in a given direction, henceforth referred to as an array orientation $O_A$, so as to form an array of vessels 50. The arrayed position corresponds to a spatial arrangement of the vessels 50 in which a flow path F for cooling air to flow through is defined between any two consecutive vessels 50 of the plurality of vessels 50. Such flow paths F extend in an orientation transverse to the array orientation $O_A$, henceforth referred to as a path orientation $O_P$. Each flow path F may be said to extend widthwise in the array orientation $O_A$ from a first one of the planes P defined by the consecutive vessels 50 to a second, opposite one of the planes P, thereby defining a width W of the flow path F. As schematically depicted in FIG. 5, when the vessels 50 are held in the arrayed position, a size of the vessels 50 in the array orientation $O_A$ is greater in the inflated vessel configuration I than in the collapsed vessel configuration C. Stated otherwise, the vessels 50 may have an inflated thickness $T_I$ when in the inflated vessel configuration and a comparatively smaller collapsed thickness $T_C$ when in the collapsed vessel configuration C. By increasing the size of the vessels 50 in the array orientation $O_A$ so as to impinge on the flow paths F, a surface area of the condenser 40 exposed to the cooling air, and thus a capacity of the condenser 40, may increase.

In some other embodiments, the support structure 60 is omitted, and the vessel 50 is arranged to be self-supporting (or free-standing). In some such embodiments, inflating the vessel 50 from the collapsed vessel configuration C to the inflated vessel configuration I urges the vessel 50 into the deployed position. In embodiments in which the condenser 40 includes a plurality of self-supporting vessels 50, inflation of the vessels 50 urges the vessels 50 individually in their respective deployed position and collectively in the arrayed position.

With reference to FIG. 2-4, structural characteristics of the condenser 40 will be discussed. In this embodiment, the vessels 50 include a frame-like structure of tubular portions 56, 58 fluidly connected to one another and together defining the cavity 50A. The tubular portions 56, 58 include header portions 56, namely top and bottom portions 56A, 56B spaced from one another along a transverse orientation $O_T$ that is orthogonal to the array $O_A$ and path $O_P$ orientations so as to be proximate to the condenser inlet 42 and the condenser outlet 44, respectively. The top portion 56A and the bottom portion 56B respectively define the vessel inlet 52 and the vessel outlet 54. The tubular portions 56, 58 also include at least one transverse portion 58, and in this case three, that extend transversely to the top and bottom portions 56A, 56B and are fluidly connected therebetween. The transverse portions 58 include first and second lateral transverse portions 58A, 58B respectively located proximate to the vessel inlet 52 and to the vessel outlet 54, and an interior transverse portion 58C disposed therebetween. The transverse portions 58 are spaced from one another along the path orientation $O_P$. Between a pair of consecutive transverse portions 58 of a same vessel 50, partitions 50B the vessel 50 extend along the path orientation $O_P$ so as to separate consecutive flow paths F from one another. In certain embodiments, the partitions 50B may omitted. The top portions 56A of the vessels 50 may be said to form part of the supply manifold with the supply conduit 46. The supply conduit 46 in this case is formed of a plurality of conduit segments 46A fluidly interconnecting the condenser inlet 42 and the top portions 56A via the corresponding vessel inlets 52. The bottom portions 56B of the vessels 50 may be said to form part of the drainage manifold with the drainage conduit 48. The drainage conduit 48 in this case includes an external conduit portion 48A in fluid communication with the condenser outlet 44, and a plurality of connecting conduit portions 48B in fluid communication between the external conduit portion 48A and the bottom portions 56B of the vessels 50. In alternate embodiments, the supply conduit 46 may instead include an external conduit portion and a plurality of connecting conduit portions similarly, mutatis mutandis, to the depicted arrangement of the drainage conduit 48. The drainage conduit 48 may instead be formed of a plurality of conduit segments interconnecting the condenser outlet 44 and the bottom portions 56B via the corresponding vessel outlets 54 similarly, mutatis mutandis, to the depicted arrangement of the supply conduit 46.

It should be noted that the vessels 50 are disposed next to one another such that their respective transverse portions 58 are disposed in a staggered relationship in the path orientation $O_P$. Referring to FIG. 3 for example, a first, a second and a third vessel 50', 50", 50''' are disposed consecutively next to one another in the array orientation $O_A$. The first, second and third vessels 50', 50", 50''' respectively have first 58A', 58A", 58A''' and second 58B', 58B", 58B''' lateral transverse portions, and at least one interior transverse portion 58C', 58C", 58C'''. The first lateral transverse portion 58A' of the first vessel 50' and the first lateral transverse portion 58A''' of the third vessel 50''' face one another on either side of the second vessel 50", albeit at an offset in the path orientation $O_P$ relative to the first lateral transverse portion 50A" of the second vessel 50". The staggered relationship may limit, and in some cases avoid, occurrences of spans of the flow path F in the path orientation $O_P$ having no contact with any transverse portion 58 of any vessel 50. It should be noted that the second vessel 50" has an additional interior transverse portion 58C", for a total of four transverse portions 58, compared to the first and third vessels 50', 50", respectively having a total of three transverse portions 58. As such, the first 58A', 58A''' and second 58B', 58B''' lateral transverse portions of the first and third vessels 50', 50''' are offset outwardly relative to the first 58A" and second 58B" lateral transverse portions of the second vessel 50". In other embodiments, the vessels 50 may have a same amount of transverse portions 58 and nonetheless be disposed in a suitable staggered relationship.

In the depicted embodiments, the tubular portions 56, 58 extend generally linearly, and the top and bottom portions 56A, 56B are connected perpendicularly to the transverse portions 58, although other arrangements are contemplated, some of which including arcuate tubular portions and/or portions interconnected at other angles. For example, in other embodiments, the vessels 50 may even include a loop-like tubular structure that defines the cavity 50A instead of the member-like tubular portions 56, 58.

In embodiments, the vessel 50 may be constructed of film sheets 50C (FIG. 4) welded to one another. For example, a pair of film sheets 50C may be used, or alternately more film sheets as required. Each film sheet 50C may be made of one or more layer of a suitable material, for example a layer of biaxially-oriented polyethylene terephthalate (BoPET), which may be metallized, i.e., combined with a metallic layer. Other suitable materials include metallic films and composite films, among others, which may be used alone or in combination depending on the embodiment. The materials may be selected and sized so as to obtain flexible film sheets 50C that are sufficiently flexible, lightweight, conductive and resistant so as to withstand maximum operational temperatures (for example a temperature close to a boiling point of the cooling fluid, e.g., 100 C in the case of water) and effective pressures (for example 137,895 Pa as stated above) of the heat exchanger 10. Various assembly means may be used to assemble the vessels 50 to one another via the supply and drainage conduits 46, 48. In some embodiments, either one or both of the supply and drainage conduits 46, 48 may be constructed of film sheets of a same or similar construction to that of the vessels 50, and may thus be welded thereto. In some such embodiments, the condenser 40 may be said to be fully inflatable. In other embodiments, either one or both of the supply and drainage conduits 46, 48 may include tubing that is more rigid than the vessels 50, so that such tubing retains its shape regardless of the vessels 50 being in the collapsed vessel configuration C or in the inflated vessel configuration I.

Turning now to FIG. 6, there is shown another embodiment in which the support structure 60 of the condenser 40 is inflatable. The support structure 60 in this case includes a plurality of tubular members 62, 64, 66 fluidly interconnected so as to form an inflatable rack-like structure sized for receiving the vessels 50 of the condenser 40. The tubular members 62, 64, 66 include two pairs of first members 62 oriented along a transverse orientation $O_T$ that is transverse to the array orientation $O_A$ and to the path orientation $O_P$, two pairs of second members 64 oriented along the path orientation $O_P$, and two pairs of third members 66 oriented along the array orientation $O_A$. The first members 62 of a same pair are spaced from one another in the path orientation $O_P$. The second members 64 of a same pair are spaced from one another in the array orientation $O_A$. The third members 66 of a same pair are spaced from one another in the transverse orientation $O_T$. In this embodiment, the vessels 50 are held in place relative to the support structure 60 via welding of their respective header portions 56 to the third members 66 of the support structure 60. Welding of the vessels 50 to the support structure 60 may also be made at other locations. It shall be noted however that the tubular members 62, 64 and 66 are not in fluid communication with the vessels 50, such that the vessels 50 and the support structure 60 may be inflated independently. The support structure 60 in this case is inflated with helium, although other inflation fluids are contemplated. Advantageously, the inflation fluid may be inflammable, which may contribute to fire containment in case of an accidental leakage.

The support structure 60 is provided with fixation means for affixing the support structure 60 to a carcass 2 of the powerplant 1 on the inside of an air cavity defined by the carcass 2 and through which the cooling air flows along a cavity orientation $O_C$ defined by the carcass 2. The fixation means may be for example fastening tabs 68 joined to the tubular members 62, 64, 66 on a side of the support structure 60 that is to be laid proximate to the carcass 2. By way of the fixation means, the support structure 60 may be oriented relative to the carcass 2 and thus orient the vessels 50 relative to the air cavity such that the path orientation $O_P$ aligns with the cavity orientation $O_C$.

In the depicted embodiment, the header portions 56 are spaced from one another in the path orientation $O_P$, and the transverse portions 58 are spaced from one another in the transverse orientation $O_T$. The support structure 60 is provided with partitions 60A arranged to close the flow paths F in the transverse orientation $O_T$. The partition 60A extends between opposite second members 64 and opposite third members 66 on either side of the vessels 50. In other embodiments, the partitions 60A may be omitted.

The air cavity may be open to the environment E of the powerplant 1 and thus be at a so-called ambient pressure. The air cavity may be in fluid communication between a cold air source of the powerplant 1 such as a ventilating fan and/or a dynamic air inlet, and a hot air exhaust of the powerplant 1 spaced from one another along the cavity orientation $O_C$. The condenser 40 may thus be suitably positioned between the cold air source and the hot air exhaust. In use, a pressure inside the support structure 60, provided that it is inflatable, typically remains greater than the ambient pressure inside the air cavity, such that the support structure 60 remains inflated. When the evaporator 30 produces little or no vapor (such that the effective pressure is less than 200 Pa for example), a pressure inside the vessels 50 may be close to the ambient pressure, such that the vessels 50 may be in the collapsed vessel configuration C whereas little cooling (e.g., cooling at less than the target cooling rate) or no cooling may occur. When the evaporator 30 produces sufficient vapor (such that the effective pressure is of at least 200 Pa for example), the pressure inside the vessels 50 may be greater than the ambient pressure, such that the vessels are in the inflated vessel configuration I whereas cooling may occur (e.g., cooling at at least the target cooling rate).

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

The invention claimed is:

1. A vapor-to-air heat exchanger for an aircraft powerplant, comprising:
   a pressurized vapor source supplying vapor; and
   a condenser including a condenser inlet in fluid communication with the pressurized vapor source to receive the vapor, a condenser outlet, and at least one pneumatic vessel defining a cavity in fluid communication between the condenser inlet and the condenser outlet, the at least one pneumatic vessel being reversibly inflatable to be configurable between a collapsed vessel configuration and an inflated vessel configuration, a volume of the cavity being greater in the inflated vessel configuration than in the collapsed vessel configuration, the at least one pneumatic vessel being inflatable from the collapsed vessel configuration to the inflated vessel configuration when the cavity is pressurized by the vapor.

2. The vapor-to-air heat exchanger of claim 1, wherein the at least one pneumatic vessel is formed of flexible film sheets welded to one another.

3. The vapor-to-air heat exchanger of claim 2, wherein at least one sheet of the flexible film sheets includes one or more of: a metallic layer; and a composite layer.

4. The vapor-to-air heat exchanger of claim 1, wherein the at least one pneumatic vessel includes a top tubular portion proximate to the condenser inlet, a bottom tubular portion proximate to the condenser outlet, and at least one transverse tubular portion fluidly connected between the top tubular portion and the bottom tubular portion.

5. The vapor-to-air heat exchanger of claim 4, wherein the condenser comprises a plurality of pneumatic vessels including the at least one pneumatic vessel, and the top tubular portion defines a portion of a supply manifold of the condenser.

6. The vapor-to-air heat exchanger of claim 4, wherein the condenser comprises a plurality of pneumatic vessels including the at least one pneumatic vessel, and the bottom tubular portion defines a portion of a drainage manifold of the condenser.

7. The vapor-to-air heat exchanger of claim 1, further comprising one or more of: a pressure regulating valve between the pressurized vapor source and the condenser inlet; and a pump between the condenser outlet and the pressurized vapor source.

8. The vapor-to-air heat exchanger of claim 1, further comprising a support structure attached to the at least one pneumatic vessel for holding the at least one pneumatic vessel in a deployed position.

9. The vapor-to-air heat exchanger of claim 8, wherein the support structure is configurable between a collapsed support configuration and an inflated support configuration, the support structure being inflatable from the collapsed support configuration to the inflated support configuration.

10. The vapor-to-air heat exchanger of claim 1, wherein the at least one pneumatic vessel is in the inflated vessel configuration when the cavity is pressurized by the vapor to at least a nominal pressure, the pressurized vapor source supplying the vapor at a source pressure of at least the nominal pressure.

11. A vapor-to-air heat exchanger for an aircraft powerplant, comprising:
an evaporator supplying vapor; and
a condenser including:
a condenser inlet in fluid communication with the evaporator to receive vapor therefrom;
a condenser outlet; and
an array of pneumatic vessels spaced from one another in an array orientation so as to define at least one air flow path along a path orientation transverse to the array orientation, at least one pneumatic vessel of the array of pneumatic vessels defining an cavity, a plane transverse to the array orientation extending through the cavity, the cavity being in fluid communication between the condenser inlet and the condenser outlet, the at least one pneumatic vessel being inflatable when the cavity is pressurized by the vapor to transition from a collapsed vessel configuration to an inflated vessel configuration, a size of the at least one pneumatic vessel in the array orientation being greater in the inflated vessel configuration than in the collapsed vessel configuration.

12. The vapor-to-air heat exchanger of claim 11, wherein the at least one pneumatized vessel includes a top tubular portion proximate to the condenser inlet, a bottom tubular portion proximate to the condenser outlet, and a plurality of transverse tubular portions fluidly connected between the top and the bottom tubular portions and spaced from one another in the path orientation.

13. The vapor-to-air heat exchanger of claim 12, wherein the at least one pneumatic vessel includes a first vessel and a second vessel next to one another on either side of the at least one flow path, a first plurality of transverse tubular portions of the first vessel and a second plurality of transverse tubular portions of the second vessel being in a staggered relationship in the path orientation.

14. A powerplant for an aircraft, comprising:
a power unit rejecting heat at a nominal heat rejection rate; and
a vapor-to-air heat exchanger including:
an evaporator thermally coupled to the power unit so as to supply vapor at a nominal pressure upon the power unit rejecting heat at the nominal heat rejection rate; and
a condenser including a condenser inlet downstream of the evaporator, a condenser outlet, and at least one pneumatic vessel being inflatable and defining an cavity in fluid communication between the condenser inlet and the condenser outlet, the at least one pneumatic vessel being configurable between a collapsed vessel configuration and an inflated vessel configuration, the at least one pneumatic vessel being inflatable from the collapsed vessel configuration to the inflated vessel configuration upon the cavity being pressurized up to the nominal pressure.

15. The powerplant of claim 14, wherein the at least one pneumatic vessel is constructed of a pair of flexible film sheets welded to one another.

16. The powerplant of claim 14, wherein the at least one pneumatic vessel includes a top tubular portion proximate to the condenser inlet, a bottom tubular portion proximate to the condenser outlet, and at least one transverse tubular portion fluidly connected between the top and the bottom tubular portions.

17. The powerplant of claim 16, wherein the condenser comprises a plurality of pneumatic vessels including the at least one pneumatic vessel, and the top tubular portion defines a portion of a supply manifold of the condenser.

18. The powerplant of claim 14, further comprising one or more of: a pressure regulating valve between the evaporator and the condenser inlet; and a pump between the condenser outlet and the evaporator.

19. The powerplant of claim 14, further comprising a support structure supporting the at least one pneumatic vessel and a carcass defining an air cavity, the support structure affixed to the carcass so as to orient the at least one pneumatic vessel relative to the air cavity.

20. The powerplant of claim 19, wherein the support structure is configurable between a collapsed support configuration and an inflated support configuration, the support structure being inflatable from the collapsed support configuration to the inflated support configuration.

* * * * *